Oct. 17, 1950
R. S. COLLEY
2,526,541
INFLATABLE CABLE-SUPPORT APPARATUS
FOR AIRCRAFT LANDING MEANS
Filed Jan. 22, 1949
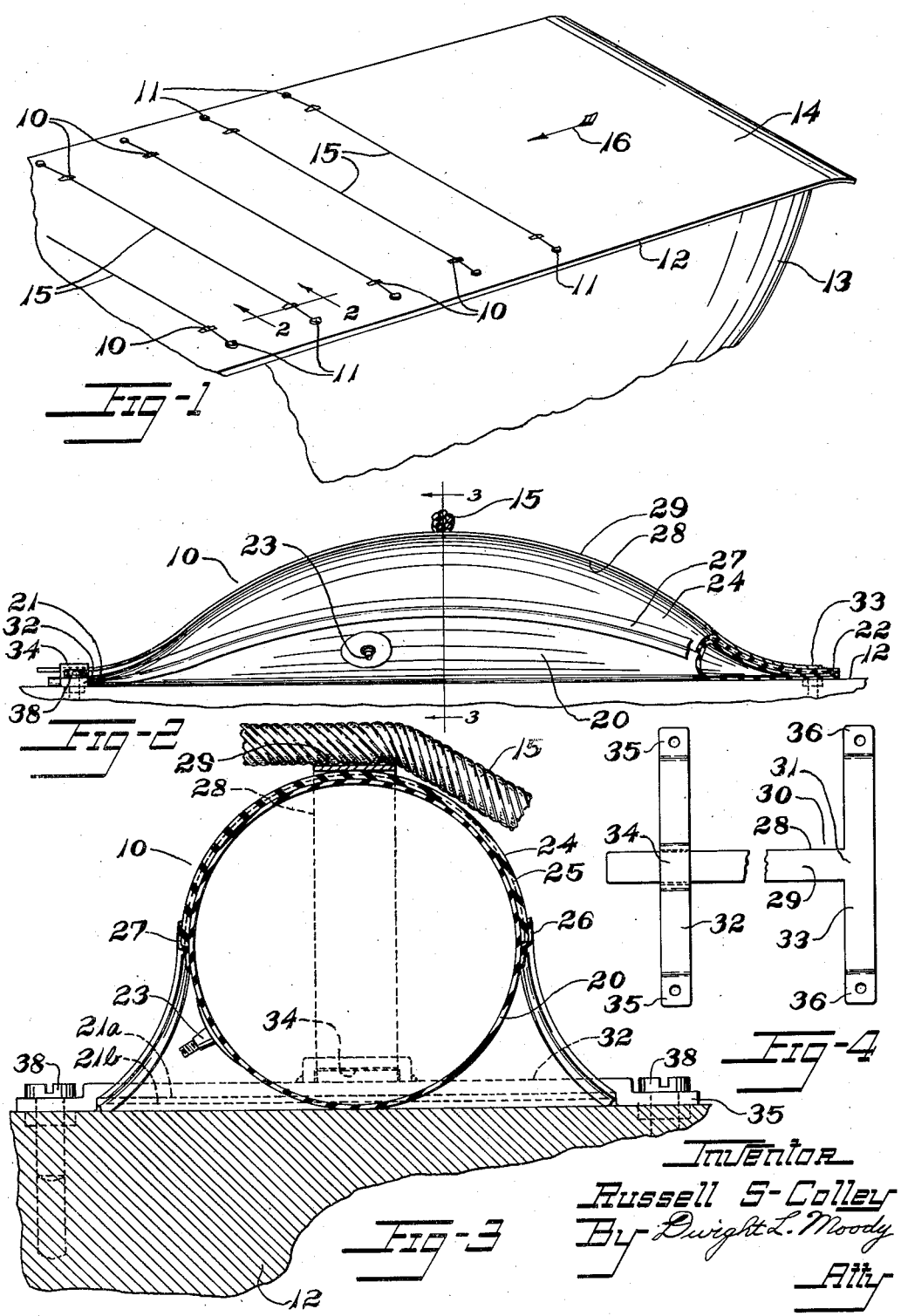
Inventor
Russell S. Colley
By Dwight L. Moody
Atty Patented Oct. 17, 1950

2,526,541

UNITED STATES PATENT OFFICE 2,526,541

INFLATABLE CABLE-SUPPORT APPARATUS FOR AIRCRAFT LANDING MEANS

Russell S. Colley, Cuyahoga Falls, Ohio, assignor to The B. F. Goodrich Company, New York, N. Y., a corporation of New York Application January 22, 1949, Serial No. 72,104

11 Claims. (Cl. 244—110)

The invention relates to yieldable support apparatus for normally maintaining a cable, rope, wire, chain, or other flexible member in spaced-apart relation to a support surface, and especially to inflatable support apparatus for an arresting cable and the like of aircraft landing or de-acceleration means for stopping the aircraft on a runway or surface of limited length.

The flight or landing deck of a warship of the aircraft carrier type presents a runway or landing surface of relatively limited extent, especially in length, as compared to that generally available at aircraft landing fields on land. For successful operation of military aircraft of the heavier-than-air type to and from the carrier ship, it has been found necessary to provide means for rapidly yet gradually de-accelerating the translational or ambulatory movement of the aircraft, once the latter has landed on the flight deck, so as to safely stop the aircraft within the length of the runway. To this end in a known, practical embodiment of aircraft de-acceleration means, there is utilized a series of longitudinally or fore-and-aft spaced-apart flexible arresting cables extending laterally or from starboard to port of the flight deck across the width of the runway. The cables when in position for engaging a dependent landing hook of the aircraft and for stopping the aircraft, are supported in a tensioned condition in spaced-apart relation to the flight deck, the supports being rigid, steel support frames hingedly attached to the flight deck at laterally spaced-apart positions to the respective sides of the fore-and-aft centerline or axis of the runway and positioned upright during landing operations.

The rigid support frames despite their retractability, constitute a safety hazard to the aircraft making a landing. For example, the direction of movement of the approaching aircraft making a landing may be angularly sidewise to the fore-and-aft axis of the runway in which case the rearwardly disposed landing hook engages off-center tending to cause yawing of the aircraft such that a landing wheel strikes the rigid support frames, whereupon the aircraft is abruptly and substantially instantaneously stopped. This frequently breaks the support frames and also produces undue stresses and severe damage to the aircraft, especially since the hook and its attachment apparatus is likely to be torn loose and wholly separated from the aircraft.

Also, when the direction of movement of the approaching aircraft is, for example, parallel with the fore-and-aft axis of the runway but the aircraft is substantially offset to a side of such axis, it is possible for a landing wheel of the aircraft to strike directly one or more of the rigid support frames. In this case, not only the support frame or frames, the wheel, and the landing gear are damaged; but in addition, the aircraft is stopped so abruptly as to likely induce "nosing-over" or tilting of the aircraft onto the front end or nose of the fuselage, which tilting may result in injury to the pilot and/or fire breaking out and consuming the aircraft, as well as probably making a major part of the de-accelerating means temporarily inoperative for subsequent aircraft landings.

An object of the invention is to overcome effectively the foregoing and other disadvantages of the aircraft de-accelerating means including the cable-support frames thereof.

Other objects of the invention are to provide for yieldably supporting and maintaining a flexible cable and the like in spaced-apart relation to a support surface; to provide means or apparatus for inflatably supporting the cable in the aforesaid relation while withstanding normal loads of the cable under tension conditions; to provide for relative movement in a plurality of directions between the cable and the inflatable means; to provide for substantial reduction of height of the inflatable support means under impact and/or emergency overload conditions; to provide for resisting failure and wear of an inflatable element of said means despite the aforesaid relative movement; to provide for resumption of position by the cable after movement of the same from its normal spaced-apart relationship; to provide for simplicity of construction, convenience of manufacture, installation and servicing, and for effectiveness of operation.

Further and more specific objects are to provide an improved support means for the arresting cables of aircraft de-acceleration means; to provide for inflatably maintaining the cables in position for landing operation of aircraft; to provide for mounting and protecting an inflatable element of said means on a runway surface; to provide for extensive movement of the cable relative to the inflatable element without objectionable wear of either the cable, or the element, or both.

These and other objects and advantages of the invention will be apparent from the following description.

In the accompanying drawings which form a part of this specification and in which like numerals are employed to designate like parts throughout the same, Fig. 1 is a perspective view from above of inflatable support apparatus or assemblies maintaining tensioned arresting cables of aircraft de-acceleration means in spaced-apart relation to a runway surface of an aircraft carrier, parts being broken away;

Fig. 2 is a view taken along line 2—2 of Fig. 1 showing one of the inflatable support assemblies and its associated cable, parts being in section and broken away;

Fig. 3 is a sectional view on an enlarged scale taken along line 3—3 of Fig. 2, parts being broken away; and Fig. 4 is a plan view of an attaching structure or frame for mounting the apparatus on the runway surface, parts being broken away.

In the illustrative embodiment of the invention shown in the drawings, the construction includes a yieldable support apparatus or assembly 10 adapted to normally maintain an arresting cable, rope, wire, chain, or other flexible member 15 of vehicle, especially aircraft, de-acceleration means 11 (shown only in part) in overlying, spaced-apart relation to a support surface 12 such, for example, as the flight or landing deck of an aircraft carrier warship 13, which deck constitutes a runway 14. The cable 15 is normally maintained under tension by de-acceleration means 11 and the cable normally extends directly across the support surface 12 in the direction laterally of the translational or ambulatory movement of the vehicle, the direction of translational movement for illustrative purposes only being indicated by an arrow at 16. The arrangement facilitates engagement of the cable or flexible member 15 with the vehicle such, for example, as an aircraft (not shown) for gradually and rapidly stopping the translational movement of the aircraft along the support surface upon operation of the means 11.

The support assembly 10 includes extensible means 20 which comprises desirably inflatable means for yieldably supporting the cable 15 in the aforesaid spaced-apart relationship to the flight deck 12. The inflatable means 20 for the arrangement shown in the drawings comprises an inflatable tubular body of resilient rubber or other rubber-like material, reinforced or unreinforced as desired, and having a wall thickness of sufficient strength to withstand normal inflating pressures which, for example, may be in the range of 3½ to 5 pounds per square inch. The tubular body in its inflated condition may have, for example, a maximum diameter of about 5 to 8 inches.

The inflatable tubular body 20 has desirably relatively flat, closed end portions 21, 22 and a generally rounded or bowed contour intermediate the end portions 21, 22 in the longitudinal direction of the body for the inflated condition, as shown especially in Fig. 2. The configuration of the elongated tubular body facilitates the provision of a generally wedge-like form at each side of the transverse, vertical center-plane of the body, i. e., its region of maximum diameter, whereby oppositely inclined upper surfaces of the body are provided. The inclined surfaces each diverge upwardly toward one another and away from an end portion 21, 22. The construction and arrangement facilitates sliding movement of the cable 15 in the direction of the translational movement of the aircraft, when the cable 15 is flexed from and especially when the same is being returned to its normal position which is shown especially in Fig. 2. The construction and arrangement is also advantageous in that the body 20 may be positioned at either side of the runway 14, which avoids special right and left-hand constructions. A further advantage is that the same body 20 may be utilized for permitting flexure of the cable 15 in either direction longitudinally of the runway 14.

The inflatable tubular body 20 intermediate its ends is provided with a suitable inflating valve 23 in communication with the interior of the body 20. The end portions 21, 22 may be vulcanized and bonded to a fully closed condition. However, portions 21a and 21b of the closed end portion 21 are preferably adhesively united as by an air-curing rubber-cement so as to permit separation of the portions 21a, 21b in response to a sudden, extensive increase in the internal pressure of the inflated body to facilitate the escape of the inflating medium or air, thereby rapidly deflating the body 20 under emergency overload conditions.

Since the tubular body 20 is desirably positioned with its longitudinal axis substantially parallel with the longitudinal centerline of the runway 14 and in attached relation to the support surface 12 and in underlying relation to the cable 15 at a position intermediate opposite margins of the runway, the sliding movement of the cable 15 under flexure conditions, especially during the return thereof to the normal position, will tend to abrade the relatively soft rubber of the body 20. Accordingly, at the upper surface of the body 20, there is provided yieldable, protective means 24 adapted to resist undue wear and/or failure of the rubber wall of the body 20.

The protective means 24 may be a relatively thick sheet of suitable resilient, rubber-like material having age-resisting and wear-resisting characteristics and may include a reinforcement 25 of woven fabric, sheet material of cotton, linen, rayon or other suitable material. The rubber-like, sheet material 24 and its reinforcement 25 extends substantially from one side of the tubular body to the other side thereof in overlying, bonded relation to the upper portion of said body 20 for presenting a bearing surface of flexible, wear-resisting characteristics to the cable 15. Reinforcing tapes 26, 27 of suitable rubber-like material may extend along the side margins of the protective means 24 in overlapping, attached relation thereto, as shown especially in Figs. 2 and 3.

To facilitate freedom of sliding movement of the cable and to avoid undue wear and abrasion of the inflatable body 20 including the means 24, the invention provides a second, yieldable, protective means comprising a protective element 28 of resilient, wear-resisting material, preferably metal strip material such, for example, as spring steel, disposed along and longitudinally of the body 20 in relatively movable, overlying and substantially conforming relation therewith for disposition between the body 20 and the cable 15. The protective element 28 presents at its outer face a bearing surface 29 extending along the element in substantial conformance to the aforesaid bowed contour of the inflatable body for disposition laterally of the cable 15 to permit the desired sliding movement of the cable along the bearing surface. The bearing surface 29 is continuous and its bowed contour facilitates the sliding movement of the cable to and from the normal position under flexure of the cable in either direction longitudinally of the inflatable body.

The arrangement makes possible relatively free movement of the cable 15 along the relatively hard, smooth bearing surface 29; inasmuch as the cable rests directly upon the bearing surface 29, although under conditions of unusual flexure the cable may also contact the other protective means 24. A further advantage of the resilient protective element 28 is that it may be deformed to a relatively flattened configuration of reduced height under accidental impact thereon by the aircraft, thereby offering minimum resistance to the passage of the aircraft thereover.

The invention provides frame means 30 for mounting the inflatable tubular body 20 on the flight deck 12 and desirably for retaining the protective element 28 in its longitudinally, overlying, movable relationship to the inflatable body 20, while permitting the accidental flattening of the protective element and the deflation of the inflatable body. For the arrangement shown the frame means comprises a T-shaped element 31 and an attaching element 32, each of suitable metal strip material.

The T-shaped element 31 has an attaching portion 33 disposed at right angles to the leg portion constituting the protective element 28 which may be integrally united with the attaching portion 33. The attaching portion 33 is centrally offset to accommodate the flattened end portion 22 of the inflatable body 20 intermediate apertured ends 36, 36 of the portion 33 for facilitating securely clamping the end portion 22 between the element 31 and the flight deck 12. The leg portion 28 for the assembled condition extends desirably beyond the attaching element 32 which is disposed at the opposite end portion 21 of the inflatable body.

The attaching element 32, like the attaching portion 33, is centrally offset for receiving the end portion 21, clamping the latter securely in place, as shown especially in Fig. 3. The element 32 at the immediate central area thereof has a recessed portion 34 to accommodate the protective element 28 so as to permit relative movement of the protective element 28 with respect to the attaching element 32 under substantial flattening of the protective element 28 by accidental impact thereon. The element 32 has apertured ends 35, 35 for receiving screw fasteners 38, 38 or other suitable fastening means for securing the frame means 30 to the flight deck, as shown especially in Figs. 1, 2 and 3.

In attaching the apparatus 10 to the flight deck 12, the inflatable tubular body 20 in the deflated condition is disposed upon the flight deck with the longitudinal axis of the body substantially parallel to the longitudinal axis of the runway 14 and at the desired location to one side of such axis of the runway intermediate the ends of the arresting cable 15, as shown especially in Fig. 1. The tubular body 20 need not be adhered to the flight deck 12. The frame means 30 may then be positioned with the attaching portion 33 of the T-shaped element 31 in the desired overlapping and clamping relation to the flat end portion 22 and with the protective element 28 extending along the longitudinal axis of the inflatable body in overlying relation therewith and beneath the cable 15. The attaching element 32 may then be disposed in overlapping, clamping relation to the other flat end portion 21 with the protective element 28 extending through the recessed portion 34 in relatively moveable relation therewith. The screw fasteners 38, 38 extend through the apertures in the end portions 35, 35 and 36, 36 and engage the underlying structure of the flight deck 12.

The inflatable body 20 is inflated to the desired pressure by means of the valve 23 to obtain the generally bowed or double wedge-like configuration, as shown especially in Figs. 2 and 3. The body 20 in the inflated condition, the protective means 24 and the protective element 28 are in substantial conformance with the configuration of each other longitudinally of the inflatable body and make possible yieldably supporting the cable 15 under tension in its normal position at the region of maximum height of the apparatus 10 longitudinally thereof, as shown especially in Fig. 2. The cable 15 rides upon the bearing surface 29 of the protective element 28 and is free to slide longitudinally of the body 20 in either direction thereof under flexure of the cable upon engagement of the latter with the aircraft. The apparatus 10 under accidental impact as by the landing wheel of the aircraft, is capable of being reduced in height to a relatively flat configuration and the inflatable body is adapted to be deflated by the separation of the portions 21a and 21b of the end portion 21, whereby the apparatus 10 offers minimum resistance to the passage of the aircraft thereover.

A second apparatus 10 is mounted in a like manner at the opposite margin and corresponding location of the runway 14, as shown especially in Fig. 1, so that the cable 15 in its tensioned condition is supported in substantially parallel spaced-apart relation to the flight deck between the pair of apparatus 10, 10, the respective ends of the cable 15 being connected in a suitable manner to the aircraft de-acceleration means 11 which is largely concealed below the flight deck 12.

For landing aircraft a plurality of the laterally-extending cables 15, 15 may be positioned spaced-apart in series longitudinally of the runway throughout the extent of the desired landing area. Each cable 15 is supported yieldably by a pair of the inflatable apparatus 10, 10 constructed and arranged as described hereinabove. In the landing operation any one of the cables may be engaged by the dependent landing hook of the aircraft, which engaged cable thereupon is flexed in the direction longitudinally of the runway such, for example, as indicated by the arrow 16. Under flexure the cable 15 may slide at least part way along the bearing surfaces 29, 29 of the protective elements 28, 28 while the aircraft de-acceleration means 11, 11 functions to gradually yet rapidly stop the translational movement of the aircraft. Upon stopping the aircraft, the cable 15 is disengaged from the latter and returned to its normal position upon the apparatus 10, 10 by sliding on and along the bearing surface 29 until the cable again extends directly across the landing runway.

When the aircraft is traveling in an angularly sidewise direction to the longitudinal axis of the runway, the reaction of the flexed cable may cause the aircraft to swing around such that its landing wheel contacts one or more of the apparatus 10, whereupon the protective element 28 is flattened to a lower height and the inflatable body 20 rapidly deflates under the impact, thus advantageously permitting relatively free movement of the aircraft over the apparatus 10.

In case the aircraft is landing substantially parallel to the longitudinal axis of the runway 14 but to one side thereof, the landing wheel may strike one or more of the apparatus 10, whereupon the apparatus assumes a relatively flat configuration of reduced height for offering minimum resistance to the passage of the landing wheel thereover. This avoids nosing-over or other damage to the aircraft, while assuring the safety of the pilot of the aircraft.

Variations may be made without departing from the scope of the invention as it is defined in the following claims.

I claim:

1. Apparatus for normally maintaining an arresting cable and the like of vehicle de-acceleration means in overlying spaced-apart relation to a support surface to facilitate engagement of said cable with the vehicle for gradually and rapidly stopping translational movement of said vehicle along said surface by virtue of operation of said means, said apparatus comprising extensible means for yieldably supporting said cable in the spaced-apart relationship, which cable under tension normally extends directly across the support surface in the direction laterally of said movement of the vehicle, said extensible means being positionable at the support surface in attached relation thereto and in underlying relation to said cable at a position intermediate opposite margins of the support surface, and yieldable protective means including a bearing surface of flexible wear-resisting material in operative overlying association with said extensible means for presenting said bearing surface to said cable, said protective means being constructed and arranged for permitting sliding movement of said cable along said bearing surface in the direction of said translational movement under flexure of said cable from its normal position upon said engagement thereof with the vehicle and for contacting at said bearing surface said cable in the normal and flexed conditions thereof, said extensible means and said protective means being deformable to a configuration of relatively reduced height under accidental impact thereon by the vehicle for offering minimum resistance to the movemnt of the vehicle thereover.

2. Apparatus for normally maintaining an arresting cable and the like of aircraft de-acceleration means in overlying spaced-apart relation to a support surface to facilitate engagement of said cable with the aircraft for gradually and rapidly stopping translational movement of said aircraft along said surface by virtue of operation of said means, said apparatus comprising extensible means for yieldably supporting said cable in the spaced-apart relationship, which cable under tension normally extends directly across the support surface in the direction laterally of said movement of the aircraft, said extensible means being positionable at the support surface in attached relation thereto and in underlying relation to said cable at a position intermediate opposite margins of the support surface, and a protective element of flexible wear-resisting material in operative overlying association with said extensible means for disposition between the latter means and said cable, said protective element presenting a bearing surface of said wear-resisting material extending along said element for disposition laterally of said cable and being constructed and arranged to permit sliding movement of said cable along said bearing surface in the direction of said translational movement under flexure of said cable from its normal position upon said engagement thereof with the aircraft and to contact at said bearing surface said cable in the normal and flexed conditions thereof, said extensible means and said protective element being deformable to a configuration of relatively reduced height under accidental impact thereon by the aircraft for offering minimum resistance to the translational movement of the aircraft thereover.

3. Apparatus for normally maintaining an arresting cable and the like of aircraft de-acceleration means in overlying spaced-apart relation to a support surface to facilitate engagement of said cable with the aircraft for gradually and rapidly stopping translational movement of said aircraft along said surface by virtue of operation of said means, said apparatus comprising inflatable means for yieldably supporting said cable in the spaced-apart relationship, which cable under tension normally extends directly across the support surface in the direction laterally of said movement of the aircraft, said inflatable means being positionable at the support surface in attached relation thereto and in underlying relation to said cable at a position intermediate opposite margins of the support surface, and yieldable protective means including a bearing surface of flexible wear-resisting material in operative overlying association with said inflatable means for presenting said bearing surface to said cable, said protective means being constructed and arranged for permitting sliding movement of said cable along said bearing surface in the direction of said translational movement under flexure of said cable from its normal position upon said engagement thereof with the aircraft and for contacting at said bearing surface said cable in the normal and flexed conditions thereof, said inflatable means and said protective means being deformable to a configuration of relatively reduced height under accidental impact thereon by the aircraft for offering minimum resistance to the movement of the aircraft thereover.

4. Apparatus for normally maintaining an arresting cable and the like of aircraft de-acceleration means in overlying spaced-apart relation to a support surface to facilitate engagement of said cable with the aircraft for gradually and rapidly stopping translational movement of said aircraft along said surface by virtue of operation of said means, said apparatus comprising inflatable means for yieldably supporting said cable in the spaced-apart relationship, which cable under tension normally extends directly across the support surface in the direction laterally of said movement of the aircraft, said inflatable means being positionable at the support surface in attached relation thereto and in underlying relation to said cable at a position intermediate opposite margins of the support surface, and a protective element of flexible wear-resisting material in operative overlying association with said inflatable means for disposition between the latter means and said cable, said protective element presenting a bearing surface of said wear-resisting material extending along said element for disposition laterally of said cable and being constructed and arranged to permit sliding movement of said cable along said bearing surface in the direction of said translational movement under flexure of said cable from its normal position upon said engagement thereof with the aircraft and to contact at said bearing surface said cable in the normal and flexed conditions thereof, said inflatable means and said protective element being deformable to a configuration of relatively reduced height under accidental impact thereon by the aircraft for offering minimum resistance to the translational movement of the aircraft thereover.

5. Apparatus for normally maintaining an arresting cable and the like of aircraft de-acceleration means in overlying spaced-apart relation to a support surface to facilitate engagement of said cable with the aircraft for gradually and rapidly stopping translational movement of said aircraft along said surface by virtue of operation of said means, said apparatus comprising an inflatable closed hollow body of generally wedge-like contour in a direction thereof in the inflated condition and positionable at the support surface in attached relation thereto and in underlying relation to said cable at a position intermediate opposite margins of the support surface for yieldably supporting in said condition said cable in the spaced-apart relationship, which cable under tension normally extends directly across the support surface in the direction laterally of said movement of the aircraft and of said contour of said body, and body protective means comprising a protective element of resilient wear-resisting material extending in operative overlying association with the inflatable body in said direction thereof for disposition between said body and said cable, said protective element presenting a bearing surface of said wear-resisting material extending along said element for disposition laterally of said cable, said element including said bearing surface having substantial conformance to the inflated contour of said inflatable body in the direction along said bearing surface for permitting sliding movement of said cable along said bearing surface in the direction of said translational movement under flexure of said cable from its normal position upon said engagement thereof with the aircraft, said inflatable body and said protective element being deformable to a configuration of relatively reduced height under accidental impact thereon by the aircraft for offering minimum resistance to the passage of the aircraft thereover.

6. Apparatus for normally maintaining an arresting cable and the like of aircraft de-acceleration means in overlying spaced-apart relation to a support surface to facilitate engagement of said cable with the aircraft for gradually and rapidly stopping translational movement of said aircraft along said surface by virtue of operation of said means, said apparatus comprising an inflatable tubular body having closed ends and a generally rounded contour intermediate said ends and longitudinally of the body in the inflated condition, said body being positionable at the support surface in attached relation thereto with the longitudinal axis of the body arranged laterally of said cable and said body being positionable in underlying relation to said cable intermediate opposite margins of the support surface for yieldably supporting in said condition said cable in the spaced-apart relationship, which cable under tension normally extends directly across the support surface in the direction laterally of said movement of the aircraft, and body protective means comprising a protective element of resilient relatively hard wear-resisting material disposed longitudinally of the inflatable body in operative overlying association therewith for disposition between said body and said cable, said protective element presenting a bearing surface of said wear-resisting material extending longitudinally of said inflatable body in substantial conformance to said contour thereof for disposition laterally of said cable to permit sliding movement of said cable along said bearing surface in the direction of said translational movement under flexure of said cable from its normal position upon said engagement thereof with the aircraft, said inflatable body and said protective element being deformable to a relatively flattened configuration of reduced height under accidental impact thereon by the aircraft for offering minimum resistance to the passage of the aircraft thereover.

7. Apparatus for normally maintaining an arresting cable and the like of aircraft de-acceleration means in overlying spaced-apart relation to a support surface to facilitate engagement of said cable with the aircraft for gradually and rapidly stopping translational movement of said aircraft along said surface by virtue of operation of said means, said apparatus comprising an inflatable tubular body having relatively flat closed end portions and a generally rounded contour intermediate said portions and longitudinally of the body in the inflated condition, said body being positionable at the support surface in attached relation thereto with the longitudinal axis of said body arranged laterally of said cable and said body being positionable in underlying relation to said cable intermediate opposite margins of the support surface for yieldably supporting in said condition said cable in the spaced-apart relationship, which cable under tension normally extends directly across the support surface in the direction laterally of said movement of the aircraft, and body protective means comprising a protective element of resilient wear-resisting metal material disposed longitudinally of the inflatable body in relatively movable overlying relation therewith for disposition between said body and said cable, said protective element presenting a bearing surface of said metal material extending along the same in substantial conformance to said contour of said inflatable body for disposition laterally of said cable to permit sliding movement of said cable along said bearing surface in the direction of said translational movement under flexure of said cable from its normal position upon said engagement thereof with the aircraft, said inflatable body and said protective element being deformable to a relatively flattened configuration of reduced height under accidental impact thereon by the aircraft for offering minimum resistance to the passage of the aircraft thereover, and means for attaching said inflatable body to said support surface and for retaining said protective element in its longitudinally overlying relationship to said inflatable body while permitting the accidental flattening of said protective element.

8. Apparatus for normally maintaining an arresting cable and the like of aircraft de-acceleration means in overlying spaced-apart relation to a support surface to facilitate engagement of said cable with the aircraft for gradually and rapidly stopping translational movement of said aircraft along said surface by virtue of operation of said means, said apparatus comprising an inflatable closed hollow body of generally bowed contour in a direction thereof in the inflated condition and positionable at the support surface in attached relation thereto and in underlying relation to said cable at a position intermediate opposite margins of the support surface for yieldably supporting in said condition said cable in the spaced-apart relationship, which cable under tension normally extends directly across the support surface in the direction laterally of said movement of the aircraft and of said contour of said body, means for inflating said body, means responsive to an abrupt substantial increase in the internal pressure of the inflated body for rapidly deflating the latter, and body protective means comprising a protective element of resilient wear-resisting material in operative overlying association with the inflatable body for disposition between the latter and said cable, said protective element presenting a bearing surface of said wear-resisting material extending along said element for disposition laterally of said cable, said element including said bearing surface having substantial conformance to said contour of said inflatable body in the direction along said bearing surface for permitting sliding movement of said cable along said bearing surface in the direction of said translational movement under flexure of said cable from its normal position upon said engagement thereof with the aircraft, said inflatable body being deflatable and said protective element being deformable to a configuration of relatively reduced height under accidental impact thereon by the aircraft for offering minimum resistance to the passage of the aircraft thereover.

9. Apparatus for normally maintaining an arresting cable and the like of aircraft de-acceleration means in overlying spaced-apart relation to a support surface to facilitate engagement of said cable with the aircraft for gradually and rapidly stopping translational movement of said aircraft along said surface by virtue of operation of said means, said apparatus comprising an inflatable tubular body having relatively flat spaced-apart closed end portions and a generally bowed contour intermediate said end portions in the longitudinal direction of said body in the inflated condition, one of said end portions having parts thereof adhesively united yet separable in response to an abrupt substantial increase in the internal pressure of the inflated body for rapidly deflating the latter, means for inflating said body, said body being positionable at the support surface in attached relation thereto with the longitudinal axis of the body arranged laterally of said cable and said body being positionable in underlying relation to said cable intermediate opposite margins of the support surface for yieldably supporting in said condition said cable in the spaced-apart relationship, which cable under tension normally extends directly across the support surface in the direction laterally of said movement of the aircraft, and body protective means comprising a protective element of resilient wear-resisting metal material disposed longitudinally of said body in relatively movable overlying relation therewith for disposition between said body and said cable, said protective element presenting a bearing surface of said metal material extending along the same in substantial conformance to said contour of said inflatable body for disposition laterally of said cable to permit sliding movement of said cable along said bearing surface in the direction of said translational movement under flexure of said cable from its normal position upon said engagement thereof with the aircraft, said inflatable body being deflated and said protective element being deformable to a relatively flattened configuration of reduced height under accidental impact thereon by the aircraft for offering minimum resistance to the passage of the aircraft thereover, and frame means for attaching said inflatable body to said support surface and for retaining said protective element in its longitudinally overlying relationship to said inflatable body while permitting the accidental flattening of said protective element.

10. A frame structure attachable to a support surface for mounting thereon an inflatable tubular body having substantially flat spaced-apart closed end portions, said frame structure comprising an element having an attaching portion for extending laterally of said body at one end portion thereof in overlapping relation therewith and attachable to said support surface for holding said body therebetween, said element including a protective portion of resilient wear-resisting strip metal material projecting from a side of said attaching portion in a direction substantially normal thereto for disposition along the longitudinal axis of said body and having a configuration substantially conforming to that of said body in the inflated condition for positioning in overlying adjacent unattached relation to the inflated body for relative movement therebetween under bending of said protective portion, and a second element for extending laterally of said body at the other end portion thereof in overlapping relation therewith and attachable to said support surface for holding said body therebetween, said second element having a recessed portion for overlying said protective portion in alignment therewith and accommodating the latter therethrough in slidingly movable relation therewith to permit the movement of said protective portion under bending of the same.

11. Aircraft de-acceleration apparatus for gradually and rapidly stopping translational movement of the aircraft upon landing of the same, said apparatus comprising a support surface constituting an aircraft runway, an arresting cable of flexible material normally extending in a condition of tension directly across said runway in spaced-apart relationship thereto between opposite margins thereof and in the direction laterally of said translational movement of the aircraft, and a pair of yieldable support assemblies each mounted on said runway and underlying said cable at a position adjacent and spaced-apart from one of said margins to maintain said cable in said spaced-apart relationship to the runway, each assembly comprising inflatable means disposed on said runway for yieldably supporting said cable, and yieldable protective means attaching said inflatable means to said runway and including a protective element of flexible wear-resisting material in operative overlying association with said inflatable means and disposed between the latter and said cable, said element presenting a bearing surface of said wear-resisting material extending laterally of said cable and constructed and arranged to permit sliding movement of said cable along said bearing surface in the direction of said translational movement of the aircraft under flexure of said cable from its normal position upon engagement of the aircraft with said cable and to contact said cable in the normal and flexed conditions thereof, said inflatable means and said protective element being deformable to a configuration of relatively reduced height under accidental impact thereon by the aircraft for offering minimum resistance to the passage of the aircraft thereover, and means for attaching said protective means to said runway.

RUSSELL S. COLLEY.

REFERENCES CITED

The following references are of record in the file of this patent:

UNITED STATES PATENTS

| Number | Name | Date |
| --- | --- | --- |
| 1,315,320 | Mesurier | Sept. 9, 1919 |
| 1,513,960 | Blakely | Nov. 4, 1924 |
| 2,140,325 | Morse | Dec. 13, 1938 |
| 2,375,443 | Sarchet | May 8, 1945 |